United States Patent [19]

Sigurdsson

[11] Patent Number: 4,900,241
[45] Date of Patent: Feb. 13, 1990

[54] MACHINE FOR PORTIONING AND CUTTING DOUGH

[76] Inventor: Alexander Sigurdsson, Sogavegur 138, 108 Reykjavik, Iceland

[21] Appl. No.: 283,775

[22] Filed: Dec. 13, 1988

[30] Foreign Application Priority Data

Dec. 12, 1987 [IS] Iceland .................................. 3296

[51] Int. Cl.$^4$ ............................................ B29C 47/92
[52] U.S. Cl. ..................................... 425/140; 83/155; 83/365; 83/651.1; 198/341; 198/859; 264/407; 264/148; 264/323; 425/141; 425/142; 425/238; 425/241; 425/311
[58] Field of Search ............ 425/140, 311, 141, 382.4, 425/378.1, 142, 238, 130, 241, 240, 376.1; 264/323, 172, 245, 40.7, 148; 83/81, 155, 365, 651.1; 198/341, 859

[56] References Cited

U.S. PATENT DOCUMENTS

| | | | |
|---|---|---|---|
| 1,852,855 | 4/1932 | Petrovic | 425/376.1 |
| 2,488,344 | 11/1949 | Stonestreet et al. | 264/148 |
| 3,499,396 | 3/1970 | Kaufman, Jr. et al. | 425/142 |
| 3,708,256 | 1/1973 | Kopp | 264/245 |
| 4,197,072 | 4/1980 | Harten | 425/378.1 |
| 4,737,092 | 4/1988 | Bullick | 425/142 |

FOREIGN PATENT DOCUMENTS 2030848  4/1980  United Kingdom ..................... 83/81

*Primary Examiner*—Jay H. Woo
*Assistant Examiner*—Timothy W. Heitbrink
*Attorney, Agent, or Firm*—Richard C. Litman

[57] ABSTRACT

The invention regards a universal machine for making cakes in usual bakeries all the way from a finished dough to baking. The machine extrudes soft or thick dough, makes portions and forms cakes for arranging on baking plates and baking, and extrudes cream and jam and similar materials. The machine is also suitable for making licorice, confectionery and any kind of forming and making portions of viscous, extrudable materials. The machine includes automatic measurement of thickness and control of thickness of the dough-cake by use of a photocell, and the photocell is fitted with runners, scale of measurement and patterns of thickness, so that the thickness of each cake is measured and cut independently. The machine is fitted with automatic measurement of frequency and control of frequency of cakes, relying upon the control of thickness. The machine has many cylinders utilizing the automatic control of thickness. Also there is an extruding outfit having mechanical control, and a manually controlled extruding outfit for liquid dough, jam, cream and such materials. The machine is a universal mechanization of the handwork of bakers, having output of 0-200 cakes/min with frequency control depending upon number of arranging workers. Output measurements have shown fourfolded output of the bakers working at the machine.

5 Claims, 4 Drawing Sheets

MACHINE FOR PORTIONING AND CUTTING DOUGH

BACKGROUND OF THE INVENTION

The present invention relates to a machine including a vertical cylinder for dough having a loading opening at the top and with pneumatic pistons for extruding the dough out through a spout at the bottom. Just below the spout there is an independent cutting unit which cuts the dough from the spout, a cutting wire in a frame, fixed to a pneumatic piston and a parallel fixed runner. Just below the frame and away from the spout there is a light-beam unit and a photocell, directing a continuous light beam under the dough into a mirror reversing the beam into the photocell.

When the dough breaks the beam, the photocell will send an electric current to a pneumatic valve 36 of the pneumatic piston, which pens the air-tube and drives the cutting wire through the dough, cuts the cake, and thus measures and controls an equal thickness of the dough-cake, independent of the speed of the dough. The thickness is controlled by means of a measuring-scale or a thickness pattern. Under the spout there is a conveyor belt, on which the cakes will fall after being cut, and which conveys them from the spout The piston is powered by a pneumatic piston, fixed to the frame of the machine, whereas the cylinder can be turned horizontally from the piston around a vertical axis, on the outside, for loading the opening. The pressure on the pneumatic piston is adjustably controlled according to frequency of the cakes.

The machine includes a cylinder for jam and a cylinder for cream, and respective spouts and respective automatic pressure controls and, in addition, a manually controlled spout. The machine is adjustable into a decided number of cakes per minute, independent of the thickness of the cakes. The conveyor belt is automatically adjustable for different continuous speeds and for different intermittent motions. The machine has an output of up to 200 cakes/min and increases, fourfold, the efficiency of handworkers in cookie making.

DESCRIPTION OF THE RELATED ART

Before baking thin cakes, it is known to form the dough by rollers, either in a plane-roller rolled into thin, endless flat strips or laminations, or formed into holes in a hole-roller, such as by rotary molding. Both roller systems include two rolls, rotating against each other and pulling the dough down from a chamber above and laminating the dough so that the thickness of the cake will be the same as the distance between the rolls in the roller.

Also known is an apparatus for forming strips as by extruding. It involves two rolls pulling the dough down from a chamber just as before, but pressing it down into a pressure chamber or rout press and from there into a spout having an opening. Below the spout there is a conveyor belt, upon which the dough is placed and is formed as a strip.

The same apparatus is used to form flat thin cakes, in which even there is arranged below the spout a wire, stretched in a frame and powered horizontally, so that the wire cuts the dough from the spout, referred to as wire-cutting. The wire-cutting is controlled by a clock, for example, at 60 cakes per minute. The thickness of the cakes will then become a result of the cutting frequency and the speed of the dough.

All these known apparatuses have in common a chamber open at the top, well accessible, and having no obstacle and therefore being easy to load dough into it. The bottom of the chamber is formed by two rolls, rotating against each other, and they power the dough down between themselves. When forming strips and separated cakes, the dough goes down into a pressure chamber, wherein the rolls maintain a pressure in the dough, and from there it issues through a spout, where the dough either forms strips or is cut into separated cakes by means of a frequency-controlled cutting wire.

By this wire-cutting the thickness of the cakes is determined by the speed of the dough issuing from the spout and the cutting frequency of the wire. The thickness of the cake thus becomes the speed divided by the frequency. The frequency is adjustable, but the speed is variable and not measured, with no connection between the speed and the cutting frequency and therefore the thickness of the cakes will be contingent with the speed. Unavoidably, the thickness of the cakes will always be changing. This is a fault requiring extra attention, control and adjustments, and thus reducing the efficiency and the quality of the product.

An equal size of cakes is not only important for sale by pieces, in that the cakes must be of equal weight, but also for packing and, most important, for the baking process itself. At the same time, thin cakes become more baked than thicker ones, and may even be over-baked, burnt or may be destroyed before the thicker ones are fully baked. The thin cakes must therefore be removed from the oven before the thicker ones. A decided and equal thickness of cakes reduces the control work, makes the baking more definite, even automatic, makes the baking time more fixed and increases the quality.

The feeding by rollers has a drawback in that the speed of the dough from the spout is difficult to adjust. It may be impossible and also it is not expected. The rollers have no speed adjustment, and such an adjustment would not serve any purpose without automatic control. For automatic control, there is a need for a single measurable character for measuring and control. That single character does not exist because there are so many factors involved. For reducing the pressure in the pressure chamber and the speed of the dough, the rolls are reversed for awhile.

For the same revolution of the rollers, the speed of the dough is dependent on the height-pressure, or the height of the dough in the chamber above and the viscosity of the dough, which may be variable for the same dough for the same cakes, and is variable for different doughs. Besides, dough is often made the day before it is baked, and stored in a cooler to become cool for forming. Then the dough becomes warmer and the viscosity is reduced by friction at the rollers, and becomes cool again. Fat in the dough reduces the friction at the rollers and reduces pressure in the pressure chamber.

Thus there are many unmanageable factors influencing the speed of the dough from the spout. Therefore the apparatus needs adjustment, the cutting frequency must be adjusted for a new dough, the height in the chamber must be kept constant, and the dough must be the same consistency. If not, the cakes will become different in thickness, because the wire is cutting at a constant frequency. The right frequency is dependent upon the height in the chamber, the viscosity of the dough at each moment, the revolutions of the rollers, adhesion of the dough to the rollers, the dimension of the spout, and the cutting frequency.

For these reasons, known dough machines are not used in smaller firms, where doughs are different. In these situations, the production of cakes is handwork. With present cookie making, the dough is kneaded and divided into 2-kg portions. From each portion there is formed a roll having the same diameter as the finished cake. The roll is stored in a cooler for making the dough stiff before cutting, then the dough is cut into slices on a cutting table by means of a knife. The output is 4–5 cakes/min per each worker and the size is quite different. With a machine according to the present invention, the output of two workers has become 1700 cakes in 40 minutes or 21.25 cakes/min per person, which is a four- to fivefold output in relation to usual handwork, and the machine is capable of cutting for up to ten arranging workers, or over 200 cakes/min.

Accordingly, shortcomings of known cake cutters are as follows:

1. There is no control of the speed of the dough. Thus the speed of the dough cannot be increased from, for example, 60 to 80 cakes/min. This is because the machines themselves are deciding, limiting and governing the output. They are made for a decided output and that output can hardly be changed.

2. There is no control of the thickness of the cakes. Thus the thickness cannot be decided to be, for example, 5 mm. The thickness of the cakes is not a measured unit. It is only a result of a variable speed, although the cutting frequency is adjustable.

3. There is no control of the frequency of the cakes.

4. The machines are not automatic.

5. The machines are only suitable for doughs, but not for extruding jams or creams. They are made for a single application and are unsuitable in usual bakeries.

The above characteristics are grave faults in known cake machines, especially in smaller firms producing cookies where many different cakes are produced and doughs are variable. These machines are unsuitable and handwork is better in such small firms. It is the purpose of the present invention to correct these faults and create a versatile machine for replacing the handwork.

SUMMARY OF THE INVENTION

The present invention is directed to an apparatus for:

1. Measuring the height or thickness of dough under the cutting level of a cutting wire, so that at a decided thickness of the cake the appliance is receiving a message that the thickness has been reached, and is sending a message to the source of power of the cutting wire to cut the thickness. In that way the thickness is controlled by the thickness itself and is independent of the speed of the dough.

Additionally, the cut will also be independent of a variation in speed of the dough. Therefore the speed of the dough can be increased without changing the thickness of the cake. Therefore the pressure in the dough can be increased or decreased, and thereby the speed of the dough can be increased or reduced according to conditions each time. For example, the speed of the dough can be reduced if one of the two arranging workers must take care of another duty for a moment, and it can be corrected again with a pressing of a button. The machine can use to the limit the working power of the place. The elasticity and the ability of accommodation of the machine bring about a better economy of the working power.

An even thickness of the cakes is a foundation of the quality control in baking processes. It reduces the control and effort involved in attending the baking and removing of single baked cakes which delays the baking of other cakes by opening the oven, which again disarranges the temperature in the oven and the baking process as a whole.

Thus also, the present invention is directed to an apparatus for:

2. Frequency measurement and frequency control of the cakes, based on control of thickness and which is performed by pressure control.

3. An increased number of cylinders for different materials and respective automatic pressure control by cylinders based on frequency control.

4. Automatic control of intermittent motion of conveyor belt and extrusion, based on frequency control and pressure control.

5. A machine having automatic control of all operations in bakeries from the kneading of the dough to arranging of the cakes on baking plates. Regarding cutting of cookies, a fourfold increase of output has been measured.

BRIEF DESCRIPTION OF THE DRAWINGS

FIG. 7 is an elevational view of the apparatus including an automatic control system.

DESCRIPTION OF THE PREFERRED EMBODIMENT

Figure 1:
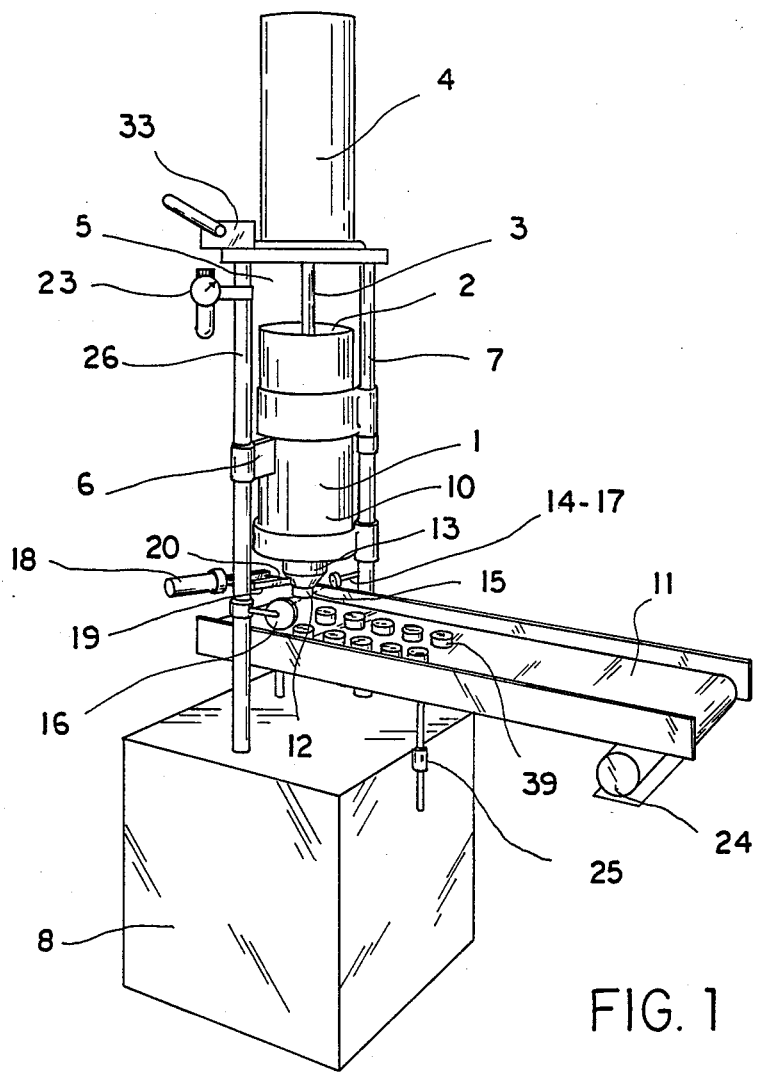
FIG. 1 is a perspective view of the apparatus according to the present invention.

FIG. 1 shows in perspective a machine for forming cookies according to the invention. The cylinder 1 having loading opening 2 comprises the chamber for the dough. The pressure in the dough-chamber 1 is formed by means of a piston on the shaft 3, which is forced by the pneumatic piston 4. During loading of the dough, the piston on the shaft 3 is pulled out from the cylinder 1 into the clearance between the cylinder and the pneumatic cylinder 4. Then the rotation lock is opened and the supporting frame and the cylinder 1 rotated 180 degrees around the axis 7 and the dough loaded into it. Then the cylinder 1 is rotated back into the original position and locked in that position by the lock 6. Then the air valve 33 is opened, for the air from the air pump 31,32 in the pump house 8, to pass through the pressure reducer 23 to the valve 33, and by means of the valve 33 the air is directed to the upper end of the pneumatic piston 4, so that it moves downwards and creates a pressure 10 in the dough determined by the pressure control or pressure reducer 23. The pressure 10 in the dough determines the speed of the dough 12 issuing through the spout 13.

Under the spout 13 there is a photocell detection or control unit 14–17 for regulating the thickness of the cakes and which is connected to a cutter assembly or unit 18–20, whereby the photocell is measuring and the cutter is cutting equal thicknesses of cakes independent of the speed of the dough.

Figure 2:
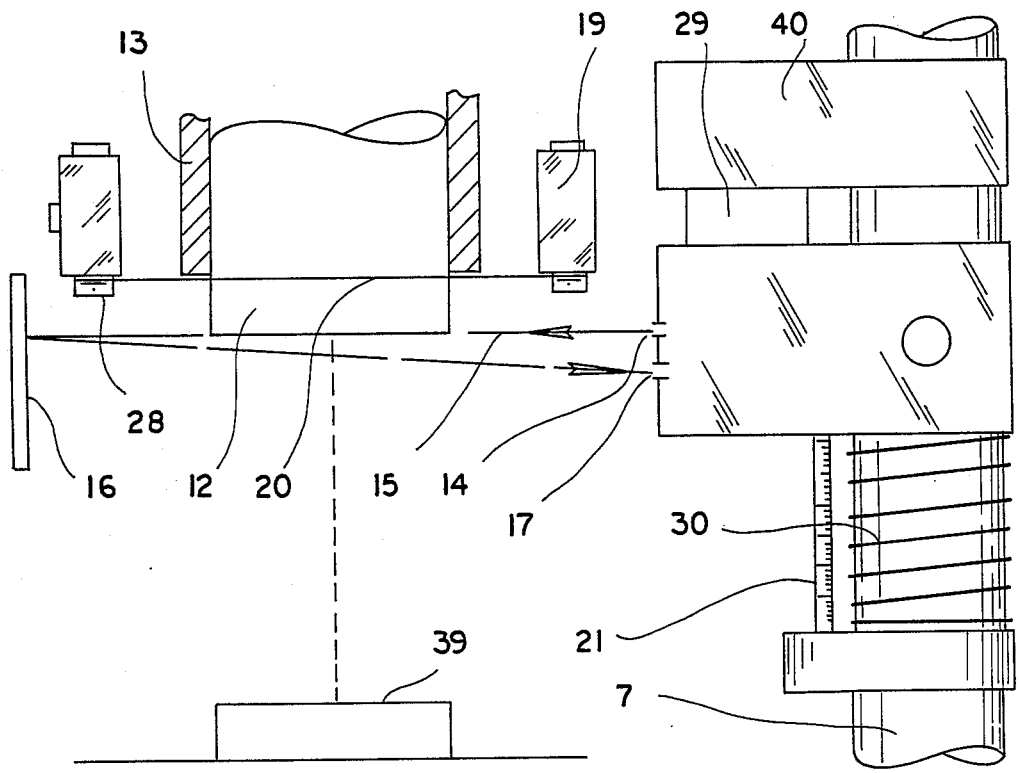
FIG. 2 is an enlarged partial view of the detection or control unit regulating the thickness of the cut product of the invention.

This above is further described with reference to FIG. 2. The source 14 of light sends a light beam 15 to the mirror 16, which reverses it to the light receiver 17, which is sending no signals of a movement to the pneumatic piston 18. When the dough 12 breaks the light beam 15 and the receiver 17 is receiving no light, it gives a signal of motion to the pneumatic piston 18, which forces the frame 19 with the cutting wire 20 through the dough 12 and cuts it from the spout 13. The light source 14 is fixed to the frame 7 of the machine, for example, by means of a screw and a runner, and is movable up and down to determine smaller or greater thicknesses of cakes.

There is a scale 21 facing downwards and fixed to the frame 7, and fixed to the source 14 of light there is a pointer showing on the scale 21 the respective thickness of the cake, which the cutter will cut. For rushing the adjustment into a new thickness or change into the cutting of greater portions, it is practical to have the source 14 of light movable along the post 7, so that the interval between it and the fixed arm 40 is equal to the thickness of the cake. Into this interval there is placed the thickness pattern 29. The spring 30 is holding the source of light in the position determined by the pattern 29. In this way it is at once possible without any measurement to adjust precisely into any predetermined thickness, even without knowing the thickness in millimeters.

Figure 3:
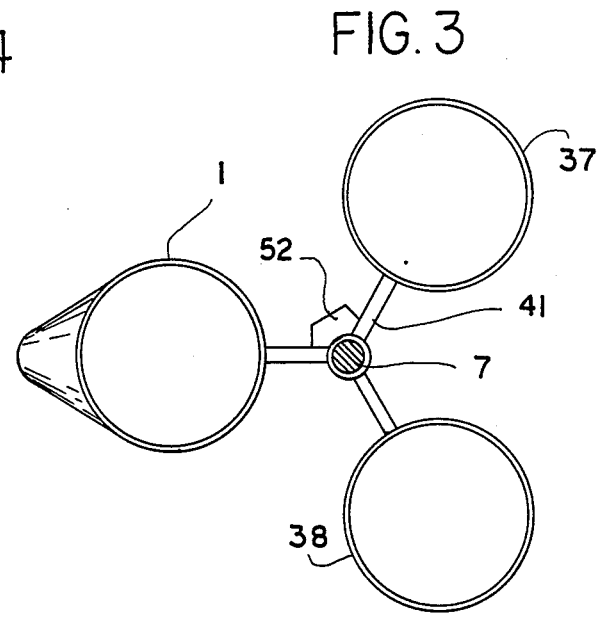
FIG. 3 is a top plan view illustrating a plurality of cylinders as used for processing different products.

FIG. 3 shows the cylinder 1 from above, together with the cylinder 37 for jam and cylinder 38 for cream which, by means of the frame 41, are connected to and rotatable around the post 7, so that a change from dough into jam or cream or another dough can take place momentarily. The multiple switch 52 receives a signal from the cylinder under the piston 4. That switch is shown on the axis 7.

Figure 4:
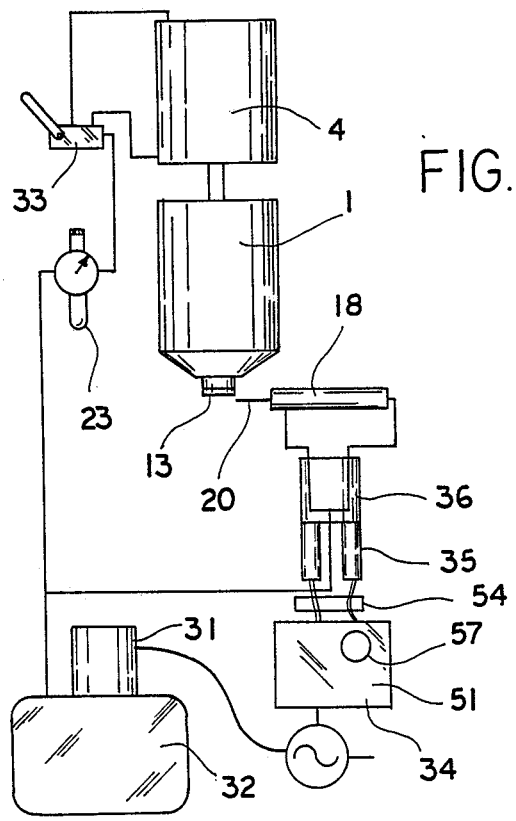
FIG. 4 is a side elevation of the pneumatic system for producing extrusion of the product.

FIG. 4 is a side view of the air pump 31, which is pressing air at 8 kg/sq cm into the air tank 32, which includes an air tube into the pressure reducer 23, where the adjustment is made into the appropriate pressure D for dough, J for jam, C for cream, and that pressure is delivered into the control valve 33, where the air is directed to the upper or lower end of the cylinder 4 and creates a respective pressure in the cylinder 1 for delivering the correct extruding speed from the spout 13. For jams and creams the pressure is constant, and the quantity portioned by opening and closing the spouts, whereas for doughs the extruding speed is increased by adjusting the pressure reducer 23 into higher pressure. Increased speed of dough has no influence on the thickness of cakes 12, as that is controlled by the light beam 15 in FIG. 2. It is just this character of the machine which is the base for its automation, the economy of labor requirements, its versatility, and its high output.

The air from the air tank 32 goes also into the air valves 36, which are powered by the electromagnetic coils 35, which open and close according to a preadjusted electric circuit control 34. The signals for moving the piston 18 are derived from the light receiver 17 in FIG. 2 and go into the circuit control 34, which sends the signals alternately to the electromagnetic coils 35, which open for the compressed air in the direction of motion and release the air out from the opposite end and finally close the same release, for muffling the impact at the end.

The above-mentioned controls of the air system are each known per se, but not as in the system described hereinabove. This other air-controlled system is only controlling the power on one hand for extruding the dough, and on the other hand for the cutting wire, but this power-controlled system does not cut cakes. A control is still lacking for determining when to cut. Known cake-cutting machines include a control to cut by an adjustably frequency, for example, 50 times per minute. This is frequency control, which is independent of the speed of the dough. The present invention includes measuring the thickness of the cake at the spout 13 and sending a message of cutting at a predetermined thickness. According to the present invention this is performed by a light receiver (photoelectric cell) or contact receiver and is called thickness control.

By means of a thickness control the air control system becomes independent for deciding the output, and a doubled speed of the dough will double the number of cakes. Thus the power-controlled system of the present invention acquires another value and character when connected to a thickness control, and acquires an extended task. It is now able to control the frequency of cakes independently and accommodate the machine to idle working power at the installation, thereby providing an elasticity which did not exist before.

Thus the photocell does does not control the frequency of the cakes, but the thickness of the cakes only, and it is always controlling the thickness, independent of everything. The control is independent. In known cutting machines for dough, this was the other way round; the cutting control was controlling the frequency of cakes and at the same time changing the thickness of the cakes, whereas the power system controlled the thickness of the cakes and changed at the same time the frequency of the cakes. Really the power was uncontrollable. Thus there was really no control, neither on the frequency nor the thickness of the cakes. By means of the present invention this will be changed.

The control described above does not include a control of the pressure 23 according to which cylinder is in use, i.e., a cylinder for dough, jam or cream, or no one. On the axis 7 or 26 on the one hand, and on the cylinder 1, 37, 38 or the frame of cylinders on the other hand, there is a multiple contact receiver distinguishing which cylinder is in contact and under the piston 3 and is sending a respective message to the control unit 51, which will select the respective pressure 23. For the cylinder for dough, an increased speed of dough can be adjusted by increasing the pressure 23. This is further shown in FIG. 7.

In the electric control unit there is a clock 57, measuring the frequency. The clock is adjustable to a determined frequency, for example 120 cakes/min. The clock increases the speed of the dough by increasing the pressure 23 until the predetermined frequency is obtained. By this means the machine is adjustable for a predetermined frequency, number of cakes per minute, independent of the viscosity of the dough.

When an unknown dough has been loaded into the cylinder 1, the receiver 52 selects the respective pressure in the dough. The clock is adjusted into 60 cakes/min for three arranging workers and the clock increases or decreases the pressure until that frequency is obtained. This takes place during the first 10 cakes. When one arranging worker must attend to the oven and leaves the machine, he adjusts the clock into 40 cakes/min for two arranging workers, and again into 60 cakes/min, when he returns. In a working place, where there is a frequent change of material in the machine and the working power must attend to many machines, the automatic accommodation of the machine to the circumstances at the moment is a great advantage, increasing the output of the place as a whole by using the working power to the limit.

Figure 5:
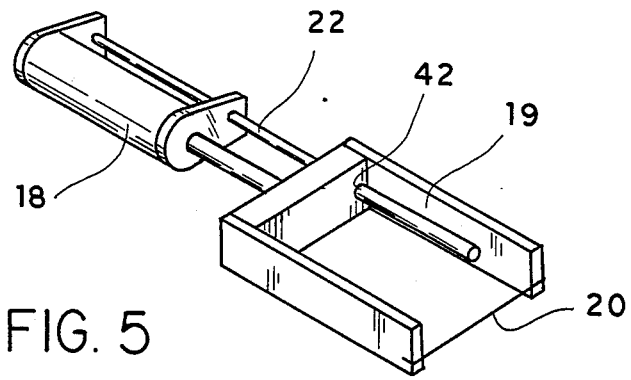
FIG. 5 is a perspective view of the frame element and its anti-turning element.

FIG. 5 is a perspective view. Parallel to to piston 18 is the runner 22, preventing the turning of the frame 19 around the axis of the piston 18. The runner is a round bar 22 parallel to the axis of the piston 18 and fixed to the surrounding cylinder itself. The runner is running through a bearing 42 in the frame 19.

Figure 6:
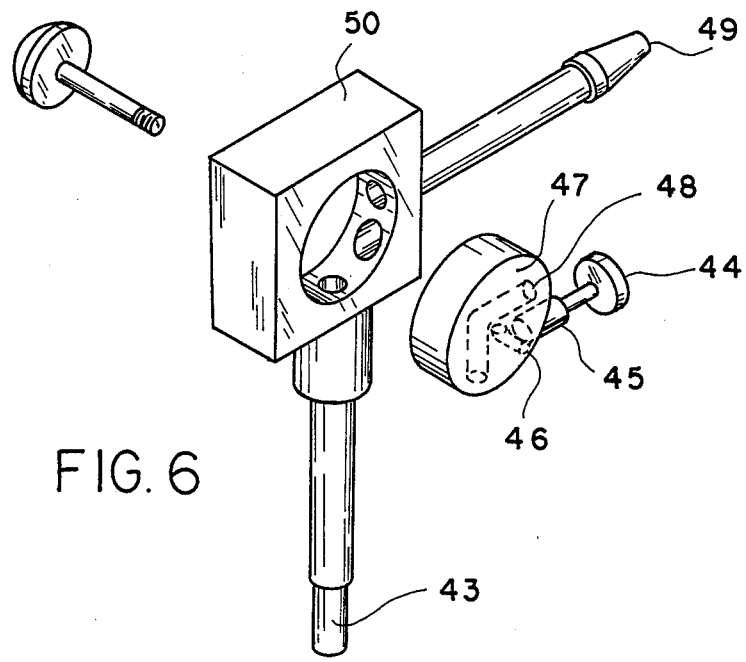
FIG. 6 is perspective view of the valved extrusion control mechanism.

FIG. 6 is a perspective view. From the spout for a hose at the cylinder 37,38 a hose 43 is provided to a manual valve 44–50 having the extrusion spout 49. By pushing with a finger the button 44 on a bar into the member 46, the valve 47 is turned in the valve house 50 and the passage 43,48,49 will open and the dough will be extruded.

FIG. 7 shows the automatic control system 55 of the machine. The multiple contact switch 52 sends a signal to the pressure selector 51, which adjusts the motorized pressure reducer 23, according to which cylinder is in use under the piston 3. The pressure reducer is connected to the adjustable unit 58 for the output. The clock 57 measures the time t between signals from the light receiver 17 and calculates 60/t as the frequency of cakes per minute and illustrates that number digitally, for example 41 cakes/min. The control system 55 compares the measured frequency 41 cakes/min to the adjusted frequency 60 cakes/min and increases the pressure if the measurement is lower than the adjustment and vice versa. The pressure is increased by signals to the pressure reducer 23.

The control unit 55 may be a computer. The conveyor belt 11 is connected to the control unit 55 and receives signals for intermittent motion or even speed according to signals from it, and receives the adjusted change of speed from the unit 58.

When the machine is used for making portions, all the description above is valid, and also applies regarding baking. The only difference is that in that case, more dough is used for each portion, because generally the portions are greater than a single cake. In that case, a higher speed is also used for the dough.

The air compressor 31 compresses 100 l/min of air into 8 kg/sq cm into the pressure reducer 23, which is reducing that pressure into 3–4 kg/sq cm to the air piston 4 for dough. That piston is 316 sq cm and creates a force of 1200 kg.

The air-powered piston 18 for the cutting wire is connected direct to the air compressor 31,32. It is 4.5 sq cm and creates a force of more than 100 kg. It operates against an opposite pressure 34 (buffer) for reducing the contact noise at the end of the cylinder.

Obviously a thickness control of the cake 12 may be added to the machines, where the dough is powered out through the spout by means of rollers. On the other hand the speed of the dough will not become adjustable except by means of adjustable force onto the dough. A pneumatic piston 4 is one way to do so. A pneumatic piston is fast and therefore also suitable for the cutting wire 20. The air-compressor can be arranged in a ventilated box under the conveyor belt 11. The air-compressor is sufficient for both pistons 4 and 18 and therefore it is suitable to power the piston 4 also by means of air, although a hydraulic piston would be less voluminous.

The machine is independent, and to work it needs only electric power for the air-compressor 31, for the motor 24 of the conveyor belt 11 and for the light source 14. The conveyor belt 11 is an independent unit, mounted on the frame of the machine by the runner 25. The runner allows elevation and lowering of the conveyor belt. The cylinder 1, the rotation lock 6, the cutter assembly or unit 18, 19, 20, 22, the mirror 16, the source of light 14 and the receiver 17 are in the same way each movable along the supporting frame of the machine, that frame consisting of two posts 7 and 26.

For preventing accidents, screens 27 (not shown in the figures) are a matter of course, a screen of plexiglass surrounding the interval 5 and in front of and in back of the spout 13 for dough, so that it is impossible to put the hand into the cutting area. The screens are turned around the post 26, while the cylinder is not turned around. The screens 27 are locked to the post 7 through a switch 54 on the electric wire to the piston 18, so that the piston is ineffective, while the screens are open.

Known machines usually run at a fixed output suitable for two labourers arranging cakes on baking plates. The output can not be increased although there is reason for doing so as workers are often idle. The machines are inflexible. This is a drawback. After a cut the cake will be thrown into the direction of the cut. Therefore the direction of cut is in the moving direction of the conveyor belt and the wire is only cutting in the one direction, and is returned below the dough without a cut. Thus the wire is not moved along a direct line to and fro, but makes a rectangular track, and the cakes make a single row on the conveyor belt. Maximum cutting frequency is only about 50 cuts/min which is suitable for two arranging workers.

A machine according to the present invention has a variable frequency of 0–200 cakes/min and is able to cut cakes for one to ten arranging workers. When two arranging workers are removing cakes from the conveyor belt and arranging them on baking plates for baking, a single row includes a double speed of the belt and therefore a long belt, and both workers must remove cakes from the same row. Two rows at a single speed is a better arrangement. Then each worker has his own row and the belt is short and occupies a small area. Therefore the cutting direction is perpendicular to the movement and the cut is to and fro, and the machine is cutting the cakes into two rows. This arrangement is thus a result from and in coordination with variable frequency.

A machine of a known type with a single or a double frequency, cutting to and fro in the direction of the conveyor belt, would throw the one row onto the other. There would be only one row, but it would be a double one and the belt would have to be of a double length. Therefore it is obvious, that a machine according to the invention has nothing in common with known machines for forming cakes, except to cut dough by means of a wire upon a conveyor belt. The arrangement according to the invention is a result from the control of the thickness of the cakes and would not have any meaning without it.

The cylinders may be two or more, even three on each post. In that case one can be loaded while another is in extrusion, and they may contain different doughs.

Obviously the machine is not limited to dough for cakes, it can manage all viscous materials, which is to be cut into slices or portions by volume, for example for cutting and portioning solid cheese into small boxes or other packing, for extruding licorice and cutting it into pieces.

The machine is also suitable for use as an extruder without a cut and thickness control, for example for extruding jam, cream and such on cakes before or after baking. One cylinder 37 for jam and two cylinders 38 for creams in addition to two cylinders 1 for dough is a suitable unit. Each cylinder has a suitable spout and the respective pressure is switched by the switch 52 and adjusted by the pressure reducer 23. Each spout includes a suitable number of extruding openings, which are closed and can be opened, where the dimension of each opening is determined by the pressure in the opening and the same extruded quantity.

For cutting cakes, it is suitable to move the conveyor belt at a constant speed, whereas for extruding jam on cakes, the cakes on the plates are placed on the conveyor belt and moved by hand or the conveyor belt is moved by intermittent motion, being steady while extruding the jam. This is called imtermittent motion. In that case the motor of the conveyor belt is working at constant speed, and is coupled to a cogwheel having one tooth, having the same time per revolution as the extruding operation.

A suitable stud engages into an opposite wheel having respective radial slots. [(Geneva wheel)]. The stud is outside the motion connected to a switch activating the extrusion. In that way the movement and the extrusion are coordinated. There is also known electric control for intermittent motion and thirdly there is known a computer control.

There are many operations in cake making, where such mechanical extrusion is not suitable, and manual control preferred. For such operations it is suitable to fit the cylinder with a hose 43 into a manual gun assembly 44-50 for dough, cream or such materials. The gun includes a turnable valve 47, which opens for the duct from the hose 43 into the spout 49, when turned. The valve is indirect, by means of a cogwheel or direct by means of a rod, connected to a button 44 or a trigger, which at a pressure or by motion turns the valve 47 and opens the duct, and then closes it again automatically, for example by means of a coiled or a straight spring. The extrusion speed is adjustable as before by means of the pressure reducer 23.

Such manual or mechanical extruding gun is replacing the common hand-squeezed tapered bags, which require great work for loading and cleaning. By this invention all such work will vanish and the extrusion is performed by a finger instead of standing while bent over the cake and squeezing the bag with both hands.

Special machines are known for extruding cream and such materials, but they are only for jam or for cream, but not both, and are include one cylinder, and they are not suitable for dough as well. The invention includes a single automatic machine, which is suitable for extruding dough for cakes of a pre-determined thickness for arrangement by from one to ten arranging workers, is suitable for extruding jam and cream, and able to change over momentarily and be adjusted into a pre-determined speed, all by pushing a button.

I claim:

1. A machine for portioning and cutting dough, said machine including:
   at least one hollow main cylinder being vertically aligned and having powered means to vertically extrude said dough through an aperture disposed at a bottom portion of said cylinder;
   a frame having two arms parallel and spaced apart on opposite sides of said aperture;
   a cutting wire stretched between said two arms, said cutting wire being just below said aperture;
   a piston rod to which said frame is connected, said piston rod being part of a pneumatic cylinder wherein said pneumatic cylinder is capable of moving said piston rod and said frame in a direction normal to said vertically aligned main cylinder such that said cutting wire travels just beneath said aperture from an extended outer position to a retracted inner position, said positions being on opposite sides of said aperture;
   a straight steering means attached to said frame to prevent said piston and said frame from rotating;
   a photocell detection unit having a light beam, between an emitter and a receiver, below a lower edge of said frame, said photocell detection unit triggering, upon blockage of said light beam by extruded dough, said pneumatic cylinder to move said piston and said frame from said outer position to said inner position or from said inner position to said outer position, thereby cutting a portion of the dough into a cake;
   adjustment means including a spring disposed below said receiver to push said receiver up toward a fixed arm, thickness patterns being insertable between said receiver and said fixed arm to control the thickness of said cakes; whereby
   said machine allows substantially uniform thickness cakes to be cut due to the high constant speed of the pneumatically driven piston, frame, and wire cutter and photocell detection unit.

2. The machine according to claim 1, wherein:
   said adjustment means for said photocell detection unit further comprising a track in which said receiver is movably mounted allowing said photocell detection unit to be vertically adjusted so as to vary the thickness of said cakes being cut by said machine.

3. The machine according to claim 2, including:
   a scale on said adjustment means to show the thickness of said cakes being cut.

4. The machine according to claim 1, including:
   a multiple hollow vertically aligned cylinders, said cylinders being circumferentially and rotatably mounted about a post;
   each said cylinder having an aperture disposed on the lower portion for the vertical extrusion of said dough, said apertures being disposable over said frame and cutting wire.

5. The machine according to claim 1, including:
   a pin mounted on each said arm of said frame, each said pin having a hole disposed through it, said cutting wire being threaded through said holes, one of said pins being rotatable about its axis so as to tighten said cutting wire.

* * * * *